(12) United States Patent
Cheung

(10) Patent No.: US 8,360,628 B2
(45) Date of Patent: *Jan. 29, 2013

(54) MARINATING DEVICE

(76) Inventor: George Cheung, Norwalk, CA (US)

( * ) Notice: Subject to any disclaimer, the term of this patent is extended or adjusted under 35 U.S.C. 154(b) by 870 days.

This patent is subject to a terminal disclaimer.

(21) Appl. No.: 12/456,383

(22) Filed: Jun. 15, 2009

(65) Prior Publication Data

US 2009/0255416 A1    Oct. 15, 2009

Related U.S. Application Data

(62) Division of application No. 11/583,221, filed on Oct. 18, 2006, now Pat. No. 7,670,042.

(51) Int. Cl.
*B01F 13/06* (2006.01)
*A47J 43/04* (2006.01)

(52) U.S. Cl. ........... 366/139; 366/228; 366/233; 99/472

(58) Field of Classification Search ............. 366/139, 366/200, 208, 213, 220, 225, 228, 233; 426/281; 99/468, 472, 534, 535
See application file for complete search history.

(56) References Cited

U.S. PATENT DOCUMENTS

| | | | | |
|---|---|---|---|---|
| 7,766 A * | 11/1850 | Starkweather | ............ | 426/281 |
| 66,559 A * | 7/1867 | Burt | ............ | 34/126 |
| 100,175 A * | 2/1870 | Miller | ............ | 366/233 |
| 105,711 A * | 7/1870 | Miller | ............ | 451/328 |
| 215,957 A * | 5/1879 | Morris | ............ | 110/246 |
| 227,120 A * | 5/1880 | Metcalf | ............ | 366/233 |
| 452,896 A * | 5/1891 | Camp | ............ | 366/168.1 |
| 1,337,716 A * | 4/1920 | Maddox | ............ | 366/208 |
| 1,432,028 A * | 10/1922 | Lister | ............ | 422/270 |
| 1,519,014 A * | 12/1924 | Watson et al. | ............ | 426/622 |
| 2,420,217 A * | 5/1947 | Allen | ............ | 406/3 |
| 2,510,858 A * | 6/1950 | Black | ............ | 366/208 |
| 2,530,403 A * | 11/1950 | Seaman | ............ | 536/60 |
| 2,539,999 A * | 1/1951 | Huzenlaub et al. | ............ | 426/311 |
| 2,597,291 A * | 5/1952 | Clegg | ............ | 366/208 |
| 2,684,206 A * | 7/1954 | Zettel | ............ | 241/97 |
| 2,793,920 A * | 5/1957 | Haaff | ............ | 384/549 |
| 3,101,040 A * | 8/1963 | Lanz | ............ | 99/471 |
| 3,146,109 A * | 8/1964 | FronDorf | ............ | 426/466 |
| 3,169,755 A * | 2/1965 | Eklund et al. | ............ | 366/220 |
| 3,203,674 A * | 8/1965 | Watson | ............ | 366/187 |
| 3,315,589 A * | 4/1967 | Hirahara | ............ | 99/534 |
| 3,502,848 A * | 3/1970 | Fink | ............ | 219/432 |
| 3,832,824 A * | 9/1974 | Burrell | ............ | 53/417 |
| 3,863,902 A * | 2/1975 | O'Brien et al. | ............ | 366/233 |
| 3,880,067 A * | 4/1975 | Hoffman | ............ | 99/472 |
| 3,905,584 A * | 9/1975 | Ratowsky | ............ | 366/200 |

(Continued)

FOREIGN PATENT DOCUMENTS

GB          2417214 A  *  2/2006

*Primary Examiner* — Charles E Cooley
(74) *Attorney, Agent, or Firm* — Raymond Y. Chan; David and Raymond Patent Firm

(57) ABSTRACT

A marinating device includes a supporting base having a blocking sidewall, a food marinating container having a guiding rib and a container sidewall physically contacted with the blocking sidewall to block a sideward movement of said food marinating container at a first sideward direction, and an electric driving arrangement. The electric driving arrangement includes a driving unit and a plurality of driving rotors adapted to be driven by the driving unit to rotate. At least two corresponding driving rotors are frictionally and alignedly engaged with the guiding rib to block the sideward movement of the food marinating container at an opposed second sideward direction such that when the food marinating container is driven to rotate via the driving rotors, the food marinating container is securely retained on the supporting base.

21 Claims, 7 Drawing Sheets

U.S. PATENT DOCUMENTS

| | | | | |
|---|---|---|---|---|
| 3,928,634 | A * | 12/1975 | Gasbarro | 426/281 |
| 3,982,259 | A * | 9/1976 | Van Baerle | 396/624 |
| 4,201,483 | A * | 5/1980 | Franzke | 366/139 |
| 4,214,518 | A * | 7/1980 | Petsche | 99/535 |
| 4,229,458 | A * | 10/1980 | Dreano et al. | 426/264 |
| 4,235,739 | A * | 11/1980 | Baatz et al. | 588/3 |
| 4,446,779 | A * | 5/1984 | Hubbard et al. | 99/472 |
| 4,517,888 | A * | 5/1985 | Gould | 99/472 |
| 4,520,718 | A * | 6/1985 | Prosenbauer | 99/535 |
| 4,785,727 | A * | 11/1988 | Miyata et al. | 99/535 |
| 4,818,550 | A * | 4/1989 | Davidson | 426/281 |
| 4,836,099 | A * | 6/1989 | Thirode | 99/472 |
| 5,104,232 | A * | 4/1992 | Lennox, III | 366/227 |
| 5,307,737 | A * | 5/1994 | Higashimoto | 99/533 |
| 5,514,030 | A * | 5/1996 | Suhner | 452/141 |
| 5,651,613 | A * | 7/1997 | Mays et al. | 366/227 |
| 5,911,827 | A * | 6/1999 | Heller | 118/19 |
| 5,947,015 | A * | 9/1999 | Laurbak | 99/535 |
| 5,972,398 | A * | 10/1999 | Ludwig et al. | 426/281 |
| 6,040,013 | A * | 3/2000 | Karales | 427/281 |
| 6,105,490 | A * | 8/2000 | Horn et al. | 99/472 |
| 6,145,432 | A * | 11/2000 | Bellue, Jr. | 99/348 |
| 6,264,359 | B1 * | 7/2001 | Buss et al. | 366/220 |
| 6,405,645 | B1 * | 6/2002 | Green | 99/468 |
| 6,497,106 | B2 * | 12/2002 | Lang et al. | 62/63 |
| 6,536,937 | B1 * | 3/2003 | Burchett | 366/139 |
| D504,143 | S * | 4/2005 | Eastman, III | D15/147 |
| 7,007,594 | B2 * | 3/2006 | Thornton et al. | 99/472 |
| 7,047,874 | B1 * | 5/2006 | Eastman, III | 99/468 |
| 7,047,875 | B1 * | 5/2006 | Eastman, III | 99/468 |
| 7,229,204 | B2 * | 6/2007 | Haskell | 366/56 |
| 7,229,656 | B2 * | 6/2007 | Paumen et al. | 426/519 |
| 7,244,061 | B1 * | 7/2007 | Curtis | 366/208 |
| 7,670,042 | B2 * | 3/2010 | Cheung | 366/139 |
| 2002/0012726 | A1 * | 1/2002 | Anders et al. | 426/281 |
| 2002/0023549 | A1 * | 2/2002 | Thornton et al. | 99/472 |
| 2003/0085234 | A1 * | 5/2003 | Paumen et al. | 220/912 |
| 2004/0134013 | A1 * | 7/2004 | Slone | 15/313 |
| 2004/0144263 | A1 * | 7/2004 | van Esbroeck et al. | 99/535 |
| 2006/0141108 | A1 * | 6/2006 | Tene | 426/281 |
| 2007/0227369 | A1 * | 10/2007 | Paumen et al. | 99/472 |
| 2008/0032013 | A1 * | 2/2008 | Paumen et al. | 426/281 |
| 2008/0050482 | A1 * | 2/2008 | Fereghetti et al. | 426/281 |
| 2008/0095902 | A1 * | 4/2008 | Cheung | 426/281 |
| 2009/0255416 | A1 * | 10/2009 | Cheung | 99/472 |
| 2011/0247505 | A1 * | 10/2011 | Davis | 99/472 |

* cited by examiner

MARINATING DEVICE

CROSS REFERENCE OF RELATED APPLICATION

This is a Divisional Application of a non-provisional application having an application number of Ser. No. 11/583,221 and a filing date of Oct. 18, 2006, now U.S. Pat. No. 7,670,042 B2.

BACKGROUND OF THE PRESENT INVENTION

1. Field of Invention

The present invention relates to a marinating device, and more particularly to a marinating device which is capable of retaining a position of a food marinating container so as to allow safe and effective marination of food, such as meat, within the food marinating container.

2. Description of Related Arts

A conventional marinating device usually comprises a supporting base having a marinating platform, a food marinating container and an electric driving arrangement mounted within the supporting base for driving the food marinating container to rotate on the marinating platform for mixing food with a predetermined of ingredients within the food marinating container.

U.S. Pat. No. 7,047,874 to Eastman, III, generally discloses a marinate tumbler comprising a base unit and a canister. The canister is rotatably placed on the base unit for marination of food within the canister. In that disclosure, there is essentially no mechanism for retaining the position of the canister while the canister is rotating. Thus, when the canister is rotating, it may displace from its normal position this that effectively affects the marination performance of that invention.

U.S. Pat. No. 7,047,875 to Eastman, III, generally discloses a marinating food tumbler apparatus, in which the food treatment apparatus comprises a base unit and a canister which comprises a shoulder portion, a first groove, a middle portion, and a second groove. The middle portion has a diameter larger than a diameter of the first groove and the second groove, in such a manner that when the canister is placed ewe on the base unit for being rotated at a predetermined speed, the shoulder, the middle portion, the first and the second groove cooperate to ensure a proper alignment of the canister with respect to the base unit.

Moreover, Eastman, III, also discloses a connecting hose mounted to the base unit for selectively connecting a vacuum pump with the canister so as to allow a user to vacuum the canister for effectively marinating the meat within the canister when the canister is driven to rotate on the base unit.

There are several disadvantages in relation to this food treatment apparatus. First, it is said that the shoulder, the middle portion, the first groove, and the second groove cooperate to ensure a proper alignment of the canister with respect to the base unit. This is fairly useful in retaining the position of the canister on the base unit. However, this prior food treatment apparatus has not considered the situation where the user himself misplaces the canister on the base unit. More specifically, although the food treatment apparatus as disclosed by Eastman, III, generally accomplishes a canister retention mechanism, it is by no means guarantee that the canister will be placed properly every time the user wishes to marinate his or her food. Thus, there is no mechanism to prevent the user of the food treatment apparatus from misplacing the canister in the first place. When the canister is indeed misplaced, the shoulder, the middle portion, the first groove, and the second groove can no longer ensure a proper alignment of the canister with respect to the base unit, wherein the user has no way of detecting the situation unless the canister derails substantially.

Second, the connecting hose of the food treatment apparatus is suspendedly extended from the base unit and selectively used for effectively marinating the food within the canister. The problem is that when the connecting hose is exposed out of the base unit, it would be very easy to be damaged by something else. This is especially when the food treatment apparatus is expected to be placed in a typical kitchen environment. When the connecting host is somehow damaged, this will substantially affect the vacuuming efficiency of the vacuum pump and therefore affect the quality of which the food is marinated.

SUMMARY OF THE PRESENT INVENTION

A main object of the present invention is to provide a marinating device which is capable of retaining a position of a food marinating container so as to allow safe and effective marination of food within the food marinating container.

Another object of the present invention is to provide a marinating device comprising a food marinating container which has a container sidewall and comprises a guiding rib for retaining a position of the marinating container when it is rotating on a supporting base. Moreover, the container sidewall acts as a reference panel for guiding a proper position of the marinating container so as to minimize the possibility of manual misplacement of the food container on the supporting base.

Another object of the present invention is to provide a marinating device comprising a vacuum device which comprises a vacuuming tube normally received within the supporting base for preventing unnecessary damage to the vacuuming tube. When the vacuuming tube is needed, the vacuuming tube is extendable from the supporting base to connect the marinating food container with a vacuum pump for vacuuming the food marinating container.

Another object of the present invention is to provide a marinating device which is capable of performing marination for more than one food marinating containers in the most efficient manner so as to maximize the circumstances in which the present invention could be utilized. In other words, the present invention is optimal for widespread application.

Accordingly, in order to accomplish the above objects, the present invention provides a marinating device, comprising:

a supporting base having a top utility side and an operation cavity indentedly formed thereon to define a blocking sidewall and a curved utility platform;

a food marinating container, having a circular cross section, having a circumferential wall and a container sidewall to define a food marinating chamber within the circumferential wall and the container sidewall, wherein the food marinating container is supported at the operation cavity at a position that the container sidewall is physically contacted with the blocking sidewall to block a sideward movement of the food marinating container at a first sideward direction, wherein the food marinating container further comprises a guiding rib coaxially provided on the circumferential wall;

an electric driving arrangement, which comprises:
a driving unit received in the supporting base; and
a plurality of driving rotors driven by the driving unit to rotate, wherein each of the driving rotors has a driving portion upwardly protruded from the utility platform to contact with the circumferential wall of the food marinating container so as to spacedly support the circumferential wall of the food marinating container in a suspended manner with respect to the utility platform, wherein at least two corresponding driving rotors are frictionally and alignedly engaged with the guiding rib to block the sideward movement of the food marinating container at an opposed second sideward direction such that when the food marinating container is driven to rotate via the driving rotors, the food marinating container is securely retained on the operation cavity at a position that the food marinating container is blocked between the blocking sidewall and the guiding rib so as to prevent a lateral movement of the food marinating container with respect to the supporting base.

These and other objectives, features, and advantages of the present invention will become apparent from the following detailed description, the accompanying drawings, and the appended claims.

DETAILED DESCRIPTION OF THE PREFERRED EMBODIMENT

Figure 1:
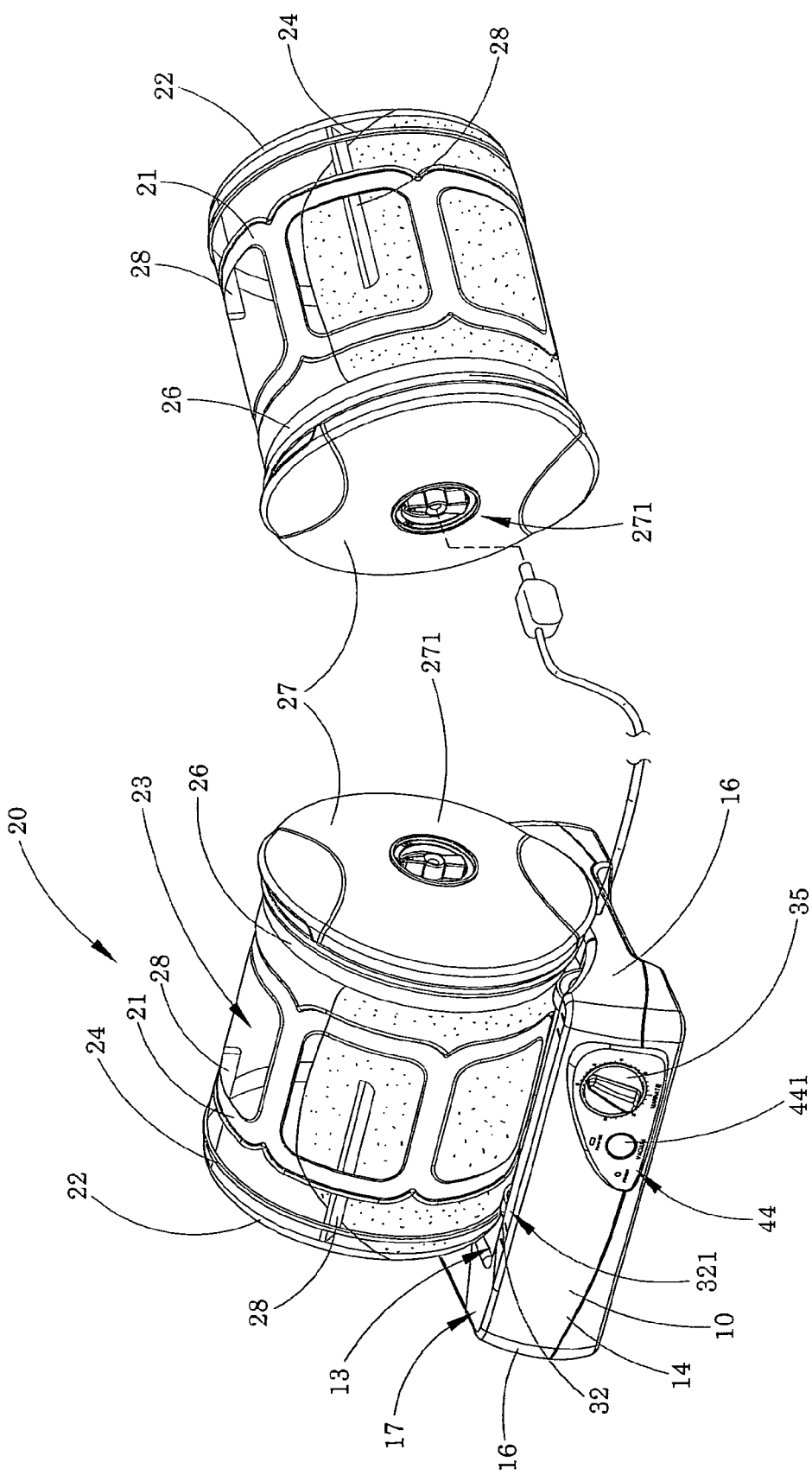
FIG. 1 is a perspective view of a marinating device according to a preferred embodiment of the present invention.

Referring to FIG. 1 to FIG. 3, and FIG. 5 of the drawings, a marinating device according to a preferred embodiment of the present invention is illustrated, in which the marinating device comprises a supporting base 10, a food marinating container 20, and an electric driving arrangement 30.

The supporting base 10 has a top utility side and an operation cavity 12 indently formed thereon to define a blocking sidewall 13 and a curved utility platform 11.

The food marinating container 20, having a circular cross section, has a circumferential wall 21 and a container sidewall 22 to define a food marinating chamber 23 within the circumferential wall 21 and the container sidewall 22, wherein the food marinating container 20 is supported at the operation cavity 12 at a position that the container sidewall 22 is adapted to contact with the blocking sidewall 13 so as to block a sideward movement of the food marinating container 20 at a first sideward direction, wherein the food marinating container 20 further comprises a guiding rib 24 coaxially provided on the circumferential wall 21.

The electric driving arrangement 30 comprises a driving unit 31 received in the supporting base 10, and a plurality of driving rotors 32. The plurality of driving rotors 32 are driven by the driving unit 31 to rotate, wherein each of the driving rotors 32 has a driving portion 321 upwardly protruded from the utility platform 11 to contact with the circumferential wall 21 of the food marinating container 20 so as to spacedly support the circumferential wall 21 of the food marinating container 20 in a suspended manner with respect to the utility platform 11, wherein at least two corresponding driving rotors 32 are frictionally and alignedly engaged with the guiding rib 24 to block the sideward movement of the food marinating container 20 at an opposed second sideward direction such that when the food marinating container 20 is driven to rotate via the driving rotors 32, the food marinating container 20 is securely retained in the operation cavity 12 at a position that the food marinating container 20 is blocked between the blocking sidewall 13 and the guiding rib 24 so as to prevent a lateral movement of the food marinating container 20 with respect to the supporting base 10.

According to the preferred embodiment of the present invention, the supporting base 10 further has a top surface 17, a front side panel 14, a rear side panel 15, and two side panels 16, wherein the operation cavity 12 is indently formed on the top surface 17 of the supporting base 10 to define the curved utility platform 11 and the blocking sidewall 13 as an inner sidewall of the operation cavity 12. The food marinating container 20 is arranged to be rotatably supported on the curved utility platform 11 for marinating the food within the food marinating container 20.

Figure 2:
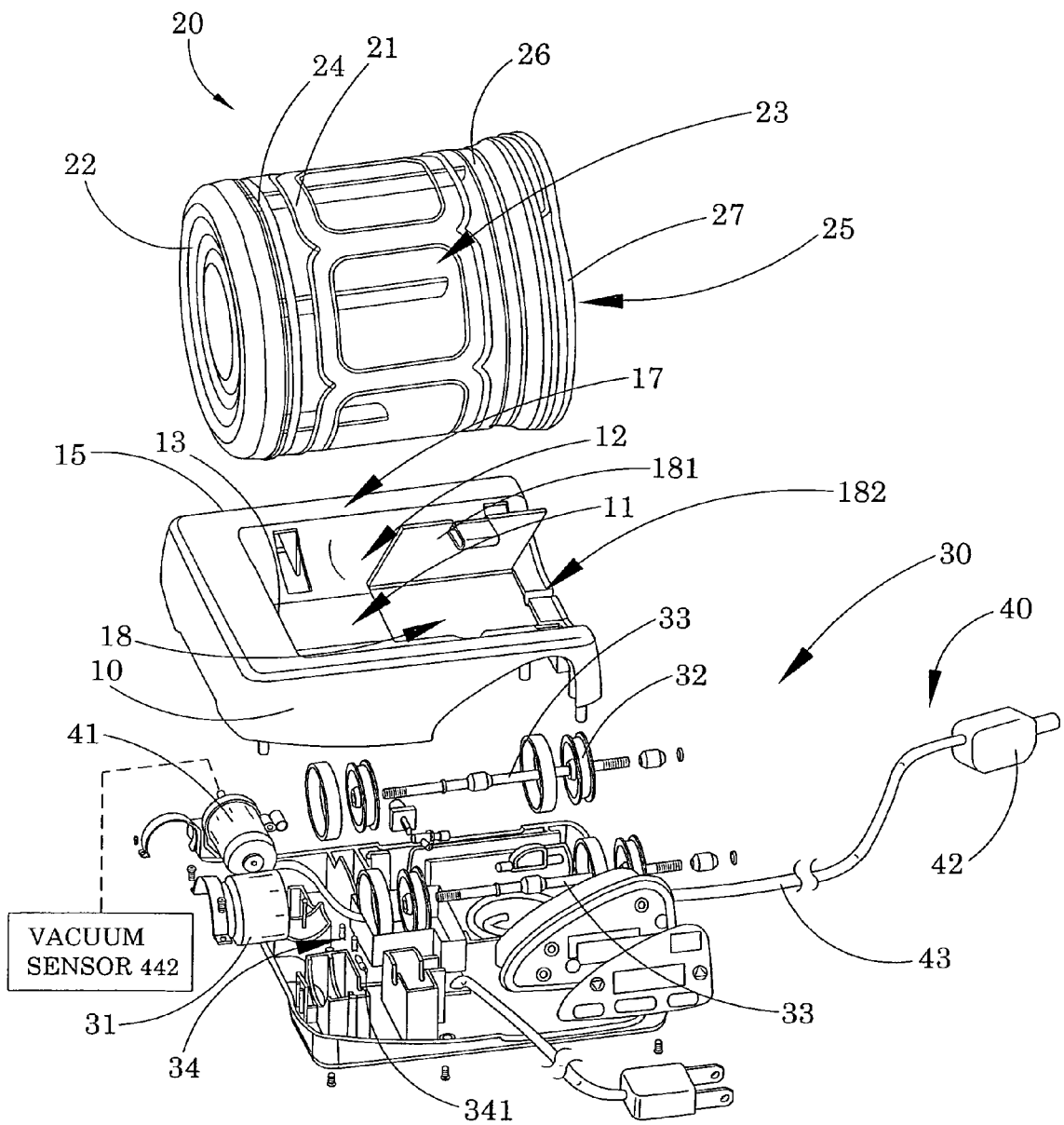
FIG. 2 is an exploded perspective view of the marinating device according to the above preferred embodiment of the present invention.
Figure 3:
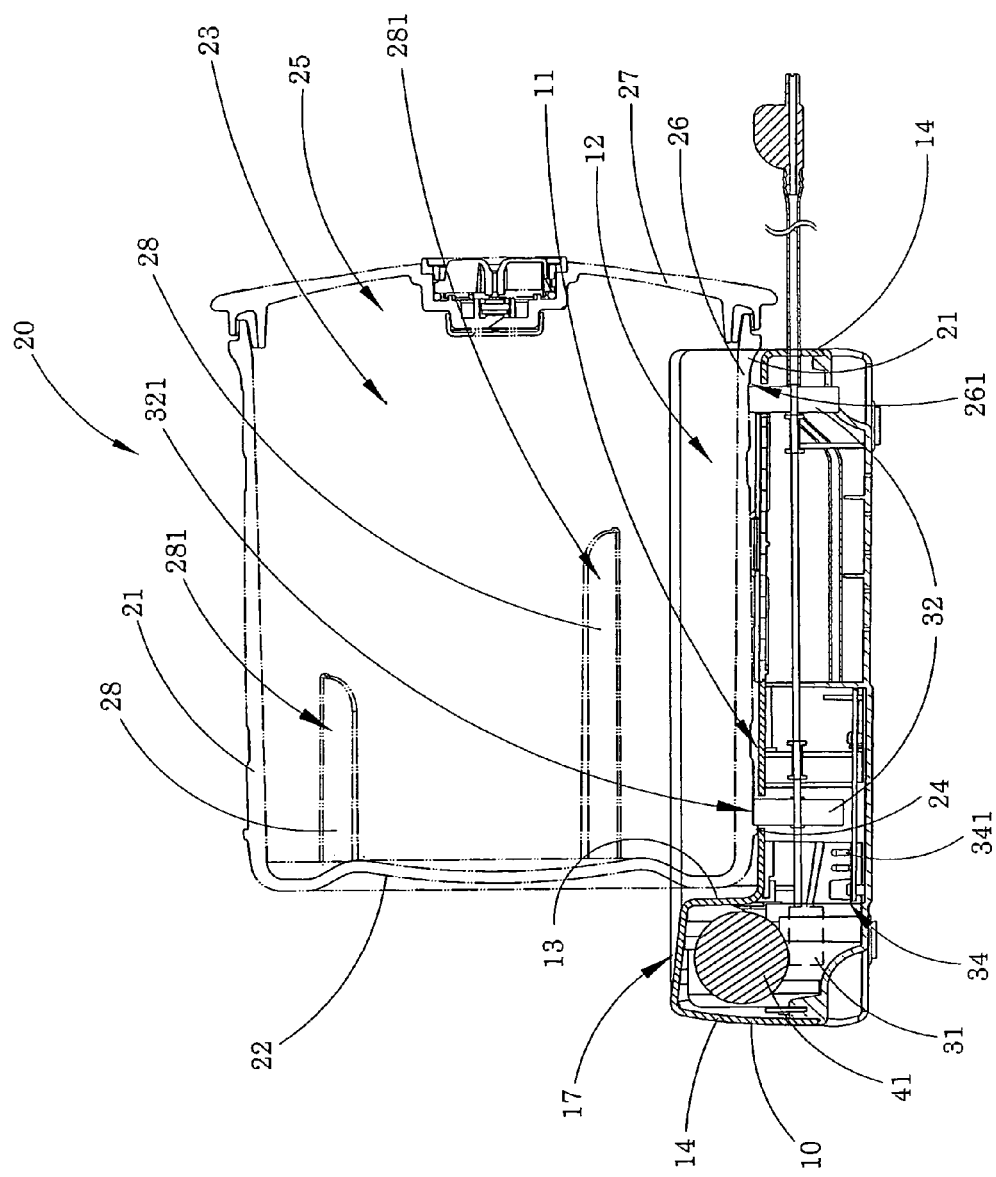
FIG. 3 is a sectional side view of the marinating device according to the above preferred embodiment of the present invention.

The food marinating container 20 is preferably made of light but durable materials so that it can be easily rotated on the curved utility platform. Thus, the circumferential wall 21 is preferably made of transparent plastic materials wherein the food marinating chamber 23 is visually accessible from an exterior of the food marinating container 20. The food marinating container 20 further has an access opening 25 formed at another side thereof (i.e. opposed to the container sidewall 22) for communicating the food marinating chamber 23 with an exterior of the food marinating container 20. Referring to FIG. 1 to FIG. 3 of the drawings, the guiding rib 24 is encirclingly formed on an inner side portion of the food marinating container 20 for frictionally engaging with the driving rotors 32 of the electric driving arrangement 30.

According to the preferred embodiment of the present invention, the food marinating container 20 further comprises a retaining rib 26 encirclingly formed on an outer side portion of the food marinating container 20 for frictionally engaging with two of the driving rotors 32 of the electric driving arrangement 30. More specifically, the retaining rib 26 has a retaining track 261 formed therealong in such a manner that when the food marinating container 20 is disposed on the curved utility platform 11, the retaining track 261 is adapted to engage with the driving portions 321 of the corresponding driving rotors 32 so as to block an outward sideward movement of the food marinating container 20. With the help of the guiding rib 24 and the retaining rib 26, the food marinating container 20 can be substantially retained on the curved utility platform 11 when the food marinating container 20 is rotating for marinating the food within the food marinating chamber 23.

On the other hand, the driving unit 31 of the electric driving arrangement 30 comprises an electric motor disposed in the supporting base 10 and operatively connected with the driving rotors 32 for driving the driving rotors 32 to rotate on the curved utility platform 10. Moreover, the electric driving arrangement 30 further comprises a rotation control unit 34 connected with the driving unit 31 for transforming a rotation speed of the driving unit 31 into a predetermined rotational speed of the driving rotors, and a plurality of rotating shafts 33 in which at least one of them connects the driving unit 31 with the corresponding driving rotors 32 in such a manner that the driving rotors are driven to rotate at the predetermined speed determined by the rotation control unit 34. As such, the manufacturer of the marinating device is able to decide an optimal rotational speed of the driving rotors 32 (by pre-programming the rotation control unit 34) in order to accomplish a desirable rotational speed of the food marinating container 20. The rotation control unit 34 comprises a speed control circuitry 341 electrically connected with the driving unit which is then adapted to drive the corresponding rotation shaft 33 to rotate in accordance with a pre-set speed determined by the speed control circuitry 341.

The marinating device further comprises a vacuum device 40 provided on the supporting base 10 for vacuuming the food marinating chamber 23 of the food marinating container 20 before it starts rotating to marinate the food within the food marinating chamber 23. The vacuum device 40 comprises a vacuum unit 41 received in the supporting base 10, a vacuum head 42 adapted for communicating with the food marinating chamber 23, and a vacuuming tube 43 connected between the vacuum unit 41 and the vacuum head 42, in such a manner that when the vacuum unit 41 is activated, air within the food marinating chamber 23 is sucked out of it via the vacuum head 42 and the vacuuming tube 43 so as to create a vacuum environment with in the food marinating chamber 23. It is expected that when the food marinating chamber 23 is completely or substantially vacuumed, marinating of food within the food marinating chamber 23 will be made the most efficient and effective.

Accordingly, the food marinating container 20 further comprises a sealing lid 27 detachably provided at the access opening 25 thereof for selectively blocking access to the food marinating chamber 23 and for sealing the food marinating chamber 23 so as to ensure an optimal vacuum environment therewithin.

It is worth mentioning that the supporting base 10 further has a receiving compartment 18 indently formed on the curved utility platform 11 for normally receiving the vacuum device 40, and a compartment cover 181 operatively connected with the curved utility platform 11 for selectively covering the receiving compartment 18. As such, when the vacuum device 40 is not in use, the vacuum head 42 and the vacuuming tube 43 are normally received into the receiving compartment 18, and the compartment cover 181 is closed for protecting the vacuum device 40. When the vacuum device 40 is to be used for vacuuming the food marinating chamber 23, the compartment cover 181 is opened to allow the vacuum head 42 and the vacuuming tube 43 to extend towards the sealing lid 27 of the food marinating container 20 for vacuuming of the food marinating chamber 23. Thus, the sealing lid 27 further comprises vacuum access valve 271 provided in the sealing lid 27 for operating between a sealing mode and vacuum mode, wherein in the sealing mode, the vacuum access valve 271 is closed for blocking fluid communication between the food marinating chamber 23 and an exterior of the food marinating container 20, wherein in the vacuum mode, the vacuum access valve 271 is opened for allowing the vacuum head 42 to be inserted into the food marinating chamber 23 so as then to allow vacuuming of the food marinating chamber 23 via the vacuum head 42 and the vacuuming tube 43 when the vacuum unit 41 is activated.

Figure 4A:
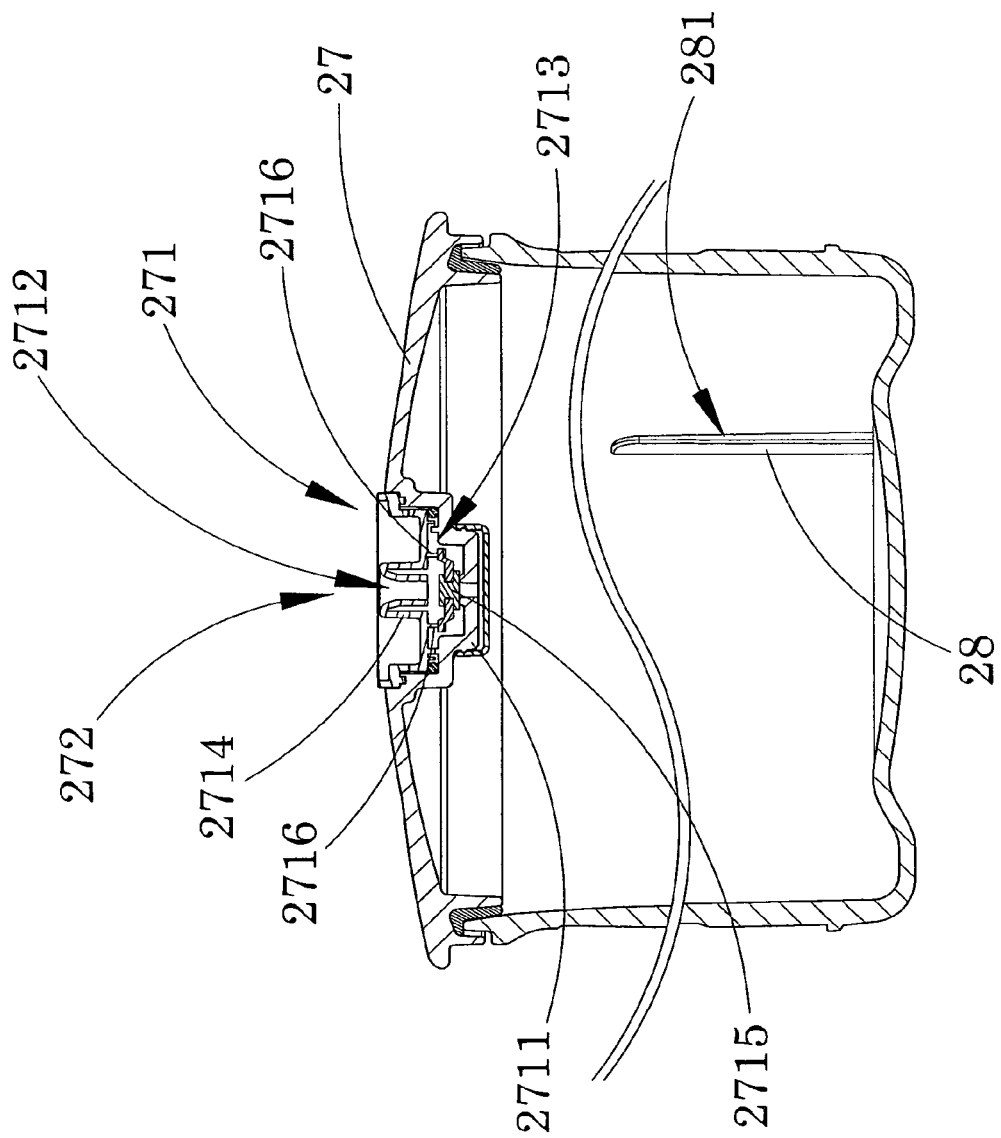
FIG. 4A to FIG. 4C are schematic diagrams of the marinating device according to the above preferred embodiment of the present invention, illustrating the operation of the sealing lid.
Figure 4B:
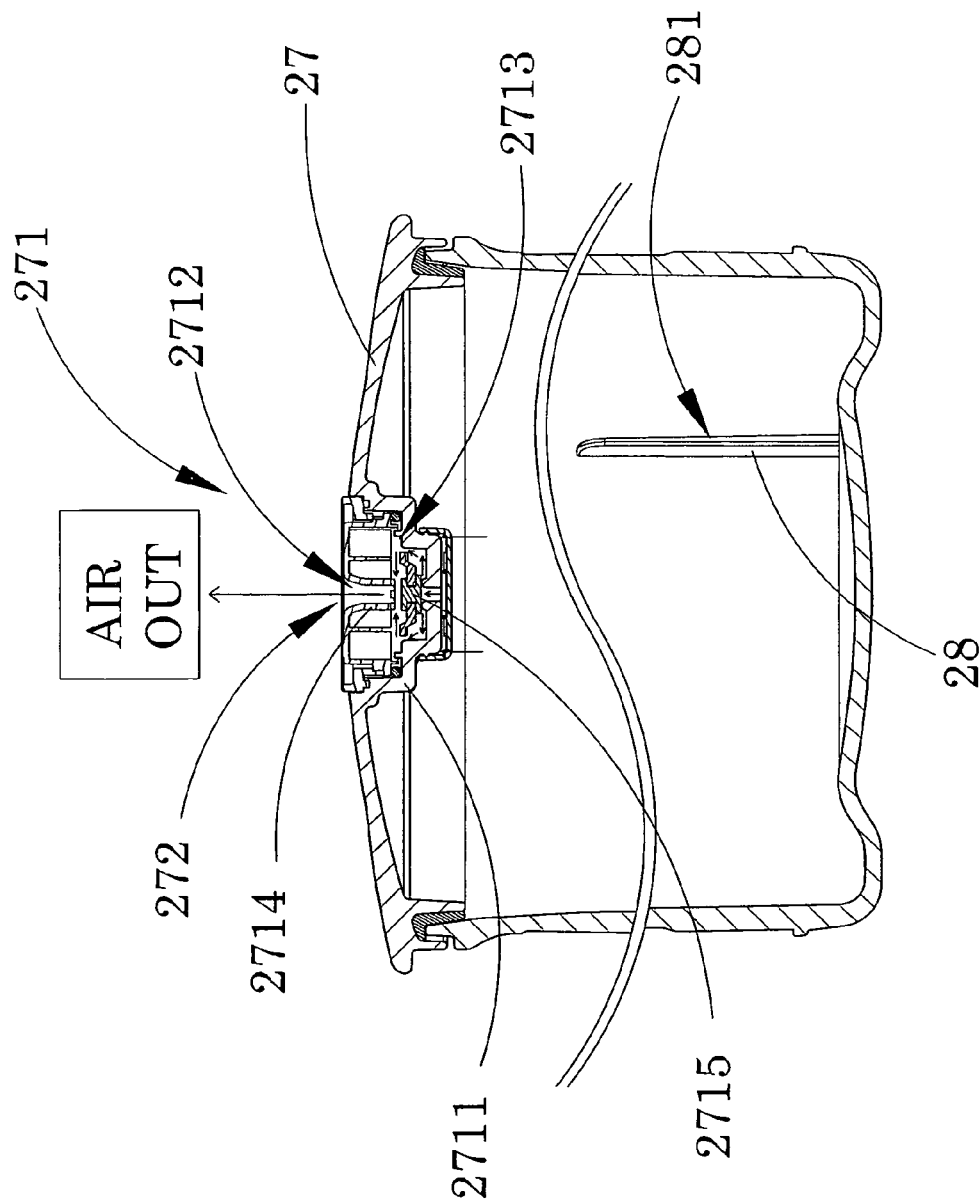
Figure 4C:
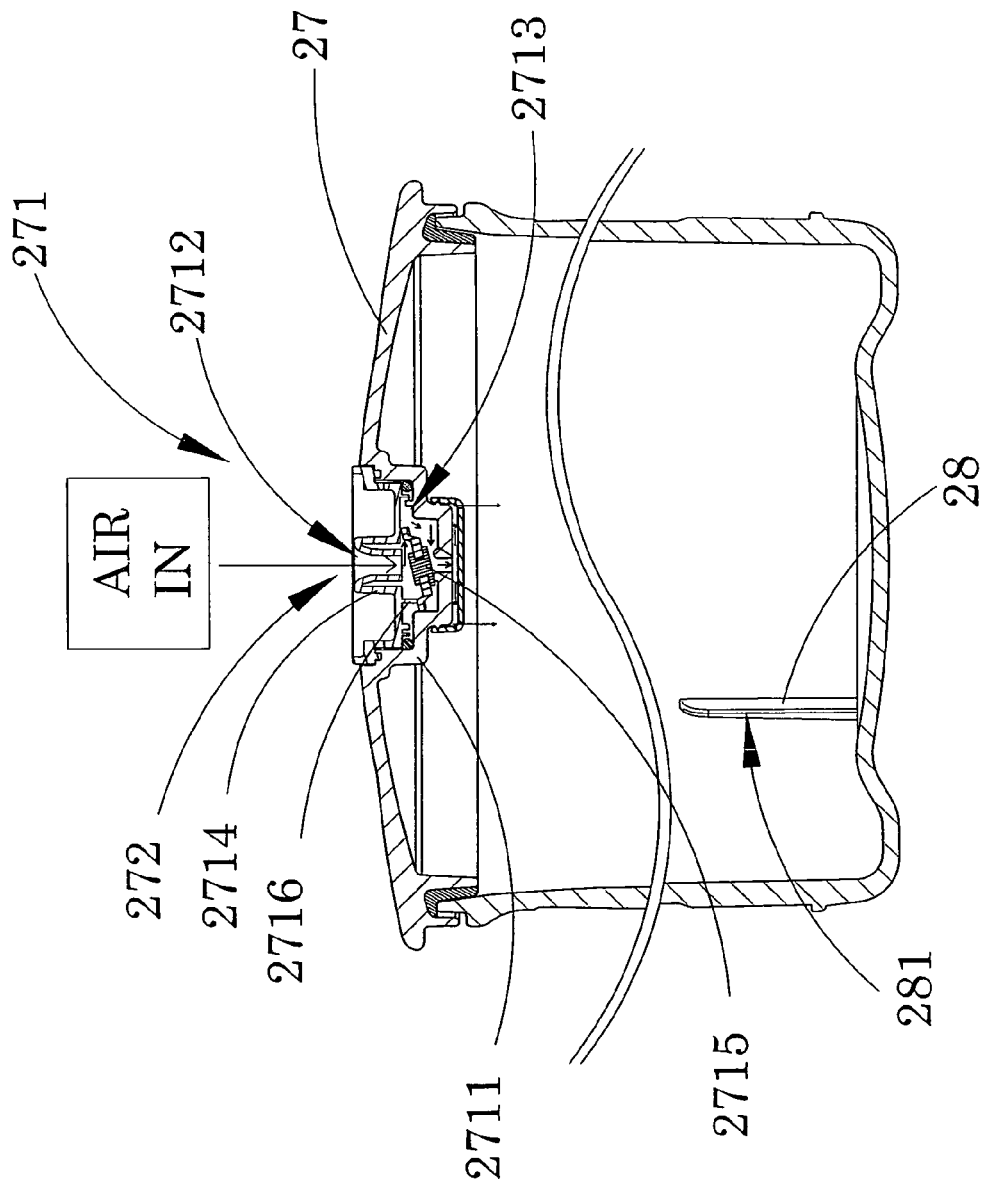

More specifically, referring to FIG. 4A to FIG. 4C of the drawings, the sealing lid 27 further has a vacuum opening 272 communicating the food marinating chamber 23 with an exterior thereof, while the vacuum access valve 271 comprises a valve housing 2711 having an air outlet 2712 adapted for engaging with the vacuum head 42 of the vacuum device 40, and an air passage 2713 communicating the food marinating chamber 23 with an exterior thereof, wherein the vacuum access valve 271 is mounted on the sealing lid 27 at the vacuum opening 272 for allowing passage of air between the food marinating chamber 23 with an exterior of the food marinating container 20 via the air passage 2713 and the air outlet 2712.

The vacuum access valve 271 further comprises a valve actuator 2714, having two air blocking members 2716, operatively mounted on the valve housing 2711, and a valve member 2715 movably provided within the valve housing 2711 to communicate with the valve actuator 2714 in such a manner that the valve member 2715 forms a boundary of the air passage 2713. When the vacuum access valve 271 is in the sealing mode (FIG. 4A), the valve actuator 2714 is rotated to drive the air blocking members 2716 to close the air passage 2713 of the valve housing 2711 so as to block air exchange between the food marinating chamber 23 and an exterior thereof via the vacuum access valve 271, and when the vacuum access valve 271 is in the vacuuming mode (FIG. 4B), the valve actuator 2714 is rotated to drive the air blocking members 2716 out of the air passage 2713 so as to allow air exchange between the food marinating chamber 23 with an exterior thereof via the air passage 2713.

It is also worth mentioning that when the vacuuming and marination process have all been completed, the user must release the vacuum access valve 271 before he or she can take out the marinated food from the food marinating chamber 23. As a result, the user must turn the valve actuator 2714 which then drives one of the blocking member 2716 out of the air passage 2713, while the other blocking member 2716 is rotated to partially block the air passage 2713 and to slightly push the valve member 2715 tilting at a predetermined angle for allowing atmospheric air to pass through the unblocked portion of the air passage 2713 and reach the food marinating chamber 23. Once air has reached the food marinating chamber 23, pressure within and out of the food marinating container 20 becomes equilibrium (FIG. 4C).

In order to allow simultaneous marination and vacuuming of another food marinating container 20, the supporting base 10 further has a receiving channel 182 indently formed on the curved utility platform 11, and extended from the receiving compartment 18 to a side edge of the supporting base 10, wherein the vacuuming tube 43 of the vacuum device 40 is allowed to selectively extend out of the receiving compartment 18 via the receiving channel 182. As a result, when the electric driving arrangement 30 is operating to rotate the food marinating container 20, the vacuum device 40 can also operate at the same time to vacuum another food marinating container 20. This feature is important in that a user of the present invention can speed up the whole marination process when he or she needs to marinate meat of different kinds which are separately contained in different food marinating container 20.

Figure 5:
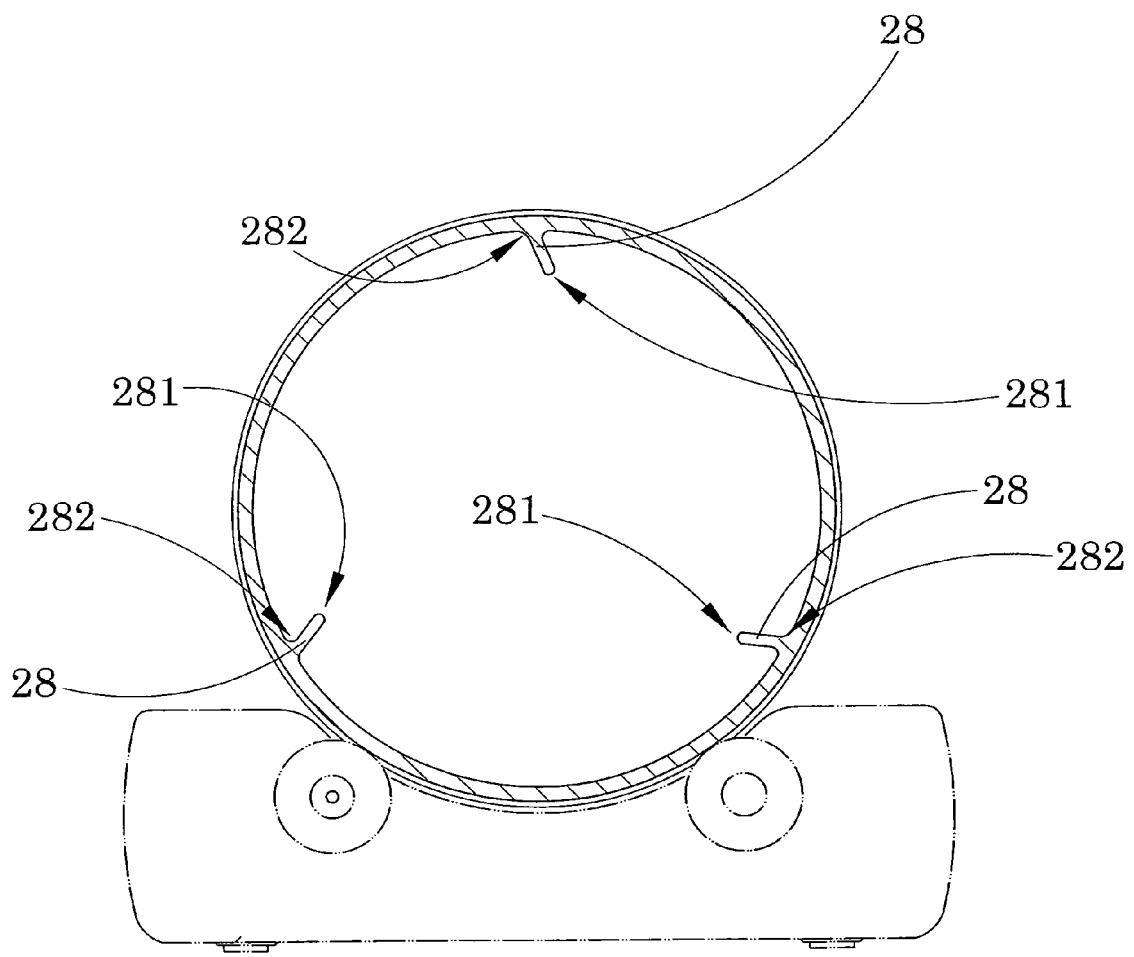
FIG. 5 is a schematic diagram of the marinating container according to the above preferred embodiment of the present invention.

Referring to FIG. 5 of the drawings, the food marinating container 20 further comprises a plurality of marinating blades 28 spacedly provided in the food marinating chamber 23 at an inner side of the circumferential wall 21 for facilitating marination of the food inside the food marinating chamber 23. More specifically, each of the marinating blades 28 has a different predetermined length and is protruded from the inner side of the circumferential wall 21 at a predetermined angle to form an inclined marinating blade portion 281 and two rounded root portions 282 at two sides of the respective marinating blade 28, in such a manner that when the food marinating container 20 is driven to rotate on the curved utility platform, the food can be uniformly and effectively marinated by the marinating blades 28. It is worth mentioning that since each of the marinating blades 28 has two rounded root portions 282, the possibility of uneven marination would be minimized. Moreover, food residuals accidentally stuck at the rounded root portions 282 are easier to clean.

According to the preferred embodiment of the present invention, there are altogether four driving rotors 32 provided on the curved utility platform 11 for rotating the food marinating container 20, wherein the first and the second driving rotors 32 are opposedly provided at an inner portion of the curved utility platform 11, while the third and the fourth driving rotors 32 are opposedly provided in the outer portion of the curved utility platform 11. It is important to point out, however, that the first and the second driving rotors 32 are mounted at an altitude (FIG. 3) which is slightly higher than that of the third and the fourth driving rotors 32 such that when the food marinating container 20 is placed on the curved utility platform 11, the food marinating container 20 is slightly tilted, as a result of gravity, towards the blocking sidewall 13 of the supporting base 10 so as to ensure that the food marinating container 20 is automatically retained on the curved utility platform 11 of the supporting base 10.

Furthermore, the vacuum device 40 further comprises a vacuum controller 44 provided at the supporting base 10 and electrically connected with the vacuum unit 41 for adjustably controlling the vacuum parameters of the vacuum unit 41. The vacuum controller 44 comprises a vacuum operator 441 provided at the supporting base 10 for allowing a user to adjust the vacuum parameter of the vacuum unit 41. Moreover, the vacuum controller 44 further comprises a vacuum sensor 442 provided at a bottom side of the supporting base 10 to electrically connect with the vacuum unit 41, in such a manner that the vacuum sensor 442 is adapted to detect a vacuum condition within the food marinating chamber 23 and deactivate the vacuum unit 41 when the food marinating chamber 23 has been completely vacuumed. More specifically, the user may adjust the time of vacuuming so as to achieve an optimal vacuum performance for marinating the food within the food marinating chamber 23. Alternatively, other vacuum parameters (e.g. strength of vacuuming) may be adjusted to provide different vacuuming function for the user of the present invention.

Finally, the electric driving arrangement 30 further comprises a control panel 35 provided at a front side of the supporting base 10 and electrically connected with the driving unit 31 and the vacuum device 40 for allowing a user to control an operation thereof through the control panel 35. Thus, the control panel 35 may comprise an on/off button, a time control button, and a status indicator for indicating the operational status of the vacuum device 40 and the electric driving arrangement 30.

The operation of the present invention is as follows: the user has first to put a predetermined amount of meat and other ingredients into the food marinating chamber 23. The user has then to close the food marinating chamber 23 by the sealing lid 27 and turn the sealing lid into the vacuum mode. After that, the user has to pull out the vacuum head 42 and the vacuum tube 43 for vacuuming the food marinating chamber 23. He or she may do so by inserting the vacuum head 42 into vacuum access valve 271. After vacuuming, the user is in the position of turning on the electric driving arrangement 30 and start the marinating process. After marination, the user should release the vacuum access valve 271, remove the sealing lid 27, and take out the marinated food accordingly.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A marinating device, comprising:

a supporting base which has a top utility side, an operation cavity indently thereon to define a blocking sidewall and a curved utility platform, a receiving compartment indently formed on said curved utility platform, and a receiving channel indently formed on said curved utility platform, and extended from said receiving compartment to a side edge of said supporting base;

a food marinating container which has a circular cross section, a circumferential wall, a container sidewall to define a food marinating chamber within said circumferential wall and said container sidewall, and an access opening formed on said food marinating container at a position opposite to said container sidewall, wherein said food marinating container is supported at said operation cavity at a position that said container sidewall is physically contacted with said blocking sidewall to block a sideward movement of said food marinating container at a first sideward direction, wherein said food marinating container further comprises a guiding rib coaxially provided on said circumferential wall;

an electric driving arrangement, which comprises:

a driving unit received in said supporting base; and a plurality of driving rotors driven by said driving unit to rotate, wherein each of said driving rotors has a driving portion upwardly protruded from said utility platform to contact with said circumferential wall of said food marinating container so as to spacedly support said circumferential wall of said food marinating container in a suspend manner with respect to said utility platform, wherein at least two corresponding driving rotors are frictionally and alignedly engaged with said guiding rib to block said sideward movement of said food marinating container at an opposed second sideward direction such that when said food marinating container is driven to rotate via said driving rotors, said food marinating container is securely retained on said operation cavity at a position that said food marinating container is blocked between said blocking sidewall and said guiding rib so as to prevent a lateral movement of said food marinating container with respect to said supporting base; and a vacuum device which comprises a vacuum unit received in said supporting base, a vacuum head adapted for communicating with said food marinating chamber, and a vacuuming tube connected between said vacuum unit and said vacuum head, in such a manner that when said vacuum unit is activated, air within said food marinating chamber is sucked out therefrom via said vacuum head and said vacuuming tube so as to create a vacuum environment within said food marinating chamber, wherein said vacuuming tube of said vacuum device is allowed to selectively extend out of said receiving compartment via said receiving channel, so that said vacuum device is adapted to not only vacuum said food marinating container on said curved utility platform, but also vacuum another said food marinating container waiting for marination.

2. The marinating device, as recited in claim 1, wherein said food marinating container further comprises a retaining rib encirclingly formed on an outer side portion of said food marinating container for frictionally engaging with two of said corresponding driving rotors of said electric driving arrangement, wherein said retaining rib has a retaining track formed therealong in such a manner that when said food marinating container is disposed on said curved utility platform, said retaining track is adapted to engage with said driving portions of said corresponding driving rotors so as to block an outward sideward movement of said food marinating container.

3. The marinating device, as recited in claim 2, wherein said food marinating container further comprises a sealing lid detachably provided at said access opening thereof for selectively blocking access to said food marinating chamber, wherein said sealing lid further comprises a vacuum access valve provided in therein for operating between a sealing mode and vacuum mode, wherein in said sealing mode, said vacuum access valve is closed for blocking fluid communication between said food marinating chamber and an exterior thereof, wherein in said vacuum mode, said vacuum access valve is opened for allowing vacuuming of said food marinating chamber.

4. The marinating device, as recited in claim 3, wherein said supporting base further has a receiving compartment indently formed on said curved utility platform, and a compartment cover operatively connected with said curved utility platform for selectively covering said receiving compartment, such that when said vacuum device is idle, said vacuum unit, said vacuum head and said vacuuming tube are normally received into said receiving compartment, and that said compartment cover is closed for protecting said vacuum device, wherein when said vacuum device is to be used, said compartment cover is opened to allow said vacuum head and said vacuuming tube to extend towards said sealing lid for vacuuming of said food marinating chamber.

5. The marinating device, as recited in claim 4, wherein said supporting base further has a receiving channel indently formed on said curved utility platform, and extended from said receiving compartment to a side edge of said supporting base, wherein said vacuuming tube of said vacuum device is allowed to selectively extend out of said receiving compartment via said receiving channel, so that said vacuum device is adapted to not only vacuum said food marinating container on said curved utility platform, but also vacuum another said food marinating container waiting for marination.

6. The marinating device, as recited in claim 5, wherein said sealing lid further has a vacuum opening communicating said food marinating chamber with an exterior thereof, wherein said vacuum access valve comprises a valve housing having an air outlet adapted for engaging with said vacuum head of said vacuum device, and an air passage communicating said food marinating chamber with said air outlet, wherein said vacuum access valve is mounted on said sealing lid at said vacuum opening for allowing passage of air between said food marinating chamber with an exterior thereof via said air passage and said air outlet.

7. The marinating device, as recited in claim 6, wherein said vacuum access valve further comprises a valve actuator, having two air blocking members, operatively mounted on said valve housing, and a valve member movably provided within said valve housing to communicate with said valve actuator, in such a manner that said valve member forms a boundary of said air passage, so that when said vacuum access valve is in said sealing mode, said valve actuator is rotated to drive said air blocking members to close said air passage of said valve housing so as to block air exchange between said food marinating chamber and an exterior thereof, and when said vacuum access valve is in said vacuum mode, said valve actuator is rotated to drive said air blocking members out of said air passage so as to allow air exchange between said food marinating chamber with an exterior thereof via said air passage.

8. The marinating device, as recited in claim 7, wherein said food marinating container further comprises a plurality of marinating blades spacedly protruded in said food marinating chamber for facilitating marination of said food in said food marinating chamber, wherein each of said marinating blades has a predetermined length, an predetermined inclined angle to effectively facilitate marinating of said food within said food marinating chamber, and two rounded root portions formed at two sides of said respective marinating blade for facilitating easy cleaning of said marinating blades.

9. The marinating device, as recited in claim 8, wherein two of said driving rotors are opposedly provided at an inner portion of said curved utility platform, while another two of said driving rotors are opposedly provided in an outer portion of said curved utility platform, wherein said driving rotors in said outer portion of said curved utility platform are mounted at an altitude which is slightly higher than that of said driving rotors in said inner portion of said curved utility platform, such that when said food marinating container is placed on said curved utility platform, said food marinating container is slightly tilted towards said blocking sidewall so as to ensure that said food marinating container is automatically guided and retained on the curved utility platform.

10. The marinating device, as recited in claim 9, wherein said vacuum device further comprises a vacuum operator provided at said supporting base for allowing a user to adjust vacuum parameters of the vacuum unit, and a vacuum sensor provided at a bottom side of said supporting base to electrically connect with said vacuum unit, in such a manner that said vacuum sensor is adapted to detect a vacuum condition within said food marinating chamber and deactivate said vacuum unit when said food marinating chamber is completely vacuumed.

11. The marinating device, as recited in claim 10, wherein said electric driving arrangement further comprises a control panel provided at a front side of said supporting base and electrically connected with said driving unit and said vacuum device for allowing a user to control an operation thereof through said control panel.

12. The marinating device, as recited in claim 11, wherein said driving unit of said electric driving arrangement comprises an electric motor disposed in the supporting base, wherein said electric driving arrangement further comprises a rotation control unit connected with said driving unit for controlling a rotational speed thereof, and a plurality of rotating shafts in which at least one of said rotating shafts connects said driving unit with said corresponding driving rotors so as to drive said driving rotors to rotate at a predetermined rotational speed controlled by said rotation control unit.

13. The marinating device, as recited in claim 4, wherein said sealing lid further has a vacuum opening communicating said food marinating chamber with an exterior thereof, wherein said vacuum access valve comprises a valve housing having an air outlet adapted for engaging with said vacuum head of said vacuum device, and an air passage communicating said food marinating chamber with said air outlet, wherein said vacuum access valve is mounted on said sealing lid at said vacuum opening for allowing passage of air between said food marinating chamber with an exterior thereof via said air passage and said air outlet.

14. The marinating device, as recited in claim 13, wherein said vacuum access valve further comprises a valve actuator, having two air blocking members, operatively mounted on said valve housing, and a valve member movably provided within said valve housing to communicate with said valve actuator, in such a manner that said valve member forms a boundary of said air passage, so that when said vacuum access valve is in said sealing mode, said valve actuator is rotated to drive said air blocking members to close said air passage of said valve housing so as to block air exchange between said food marinating chamber and an exterior thereof, and when said vacuum access valve is in said vacuum mode, said valve actuator is rotated to drive said air blocking members out of said air passage so as to allow air exchange between said food marinating chamber with an exterior thereof via said air passage.

15. The marinating device, as recited in claim 14, wherein said food marinating container further comprises a plurality of marinating blades spacedly protruded in said food marinating chamber for facilitating marination of said food in said food marinating chamber, wherein each of said marinating blades has a predetermined length, an predetermined inclined angle to effectively facilitate marinating of said food within said food marinating chamber, and two rounded root portions formed at two sides of said respective marinating blade for facilitating easy cleaning of said marinating blades.

16. The marinating device, as recited in claim 15, wherein two of said driving rotors are opposedly provided at an inner portion of said curved utility platform, while another two of said driving rotors are opposedly provided in an outer portion of said curved utility platform, wherein said driving rotors in said outer portion of said curved utility platform are mounted at an altitude which is slightly higher than that of said driving rotors in said inner portion of said curved utility platform, such that when said food marinating container is placed on said curved utility platform, said food marinating container is slightly tilted towards said blocking sidewall so as to ensure that said food marinating container is automatically guided and retained on the curved utility platform.

17. The marinating device, as recited in claim 16, wherein said vacuum device further comprises a vacuum operator provided at said supporting base for allowing a user to adjust vacuum parameters of the vacuum unit, and a vacuum sensor provided at a bottom side of said supporting base to electrically connect with said vacuum unit, in such a manner that said vacuum sensor is adapted to detect a vacuum condition within said food marinating chamber and deactivate said vacuum unit when said food marinating chamber is completely vacuumed.

18. The marinating device, as recited in claim 3, wherein said sealing lid further has a vacuum opening communicating said food marinating chamber with an exterior thereof, wherein said vacuum access valve comprises a valve housing having an air outlet adapted for engaging with said vacuum head of said vacuum device, and an air passage communicating said food marinating chamber with said air outlet, wherein said vacuum access valve is mounted on said sealing lid at said vacuum opening for allowing passage of air between said food marinating chamber with an exterior thereof via said air passage and said air outlet.

19. The marinating device, as recited in claim 18, wherein said vacuum access valve further comprises a valve actuator, having two air blocking members, operatively mounted on said valve housing, and a valve member movably provided within said valve housing to communicate with said valve actuator, in such a manner that said valve member forms a boundary of said air passage, so that when said vacuum access valve is in said sealing mode, said valve actuator is rotated to drive said air blocking members to close said air passage of said valve housing so as to block air exchange between said food marinating chamber and an exterior thereof, and when said vacuum access valve is in said vacuum mode, said valve actuator is rotated to drive said air blocking members out of said air passage so as to allow air exchange between said food marinating chamber with an exterior thereof via said air passage.

20. The marinating device, as recited in claim 2, wherein said supporting base further has a receiving compartment indently formed on said curved utility platform, and a compartment cover operatively connected with said curved utility platform for selectively covering said receiving compartment, such that when said vacuum device is idle, said vacuum unit, said vacuum head and said vacuuming tube are normally received into said receiving compartment, and that said compartment cover is closed for protecting said vacuum device, wherein when said vacuum device is to be used, said compartment cover is opened to allow said vacuum head and said vacuuming tube to extend towards said sealing lid for vacuuming of said food marinating chamber.

21. The marinating device, as recited in claim 20, wherein said supporting base further has a receiving channel indently formed on said curved utility platform, and extended from said receiving compartment to a side edge of said supporting base, wherein said vacuuming tube of said vacuum device is allowed to selectively extend out of said receiving compartment via said receiving channel, so that said vacuum device is adapted to not only vacuum said food marinating container on said curved utility platform, but also vacuum another said food marinating container waiting for marination.

\* \* \* \* \*